United States Patent [19]

Sudau

[11] Patent Number: 5,766,109
[45] Date of Patent: Jun. 16, 1998

[54] TORSIONAL VIBRATION DAMPER WITH A PLANETARY GEARSET

[75] Inventor: Jörg Sudau, Niederwerrn, Germany

[73] Assignee: Fichtel & Sachs AG, Schweinfurt, Germany

[21] Appl. No.: 866,538

[22] Filed: May 30, 1997

Related U.S. Application Data

[62] Division of Ser. No. 665,465, Jun. 18, 1996, Pat. No. 5,634,866, which is a division of Ser. No. 358,697, Dec. 19, 1994, Pat. No. 5,551,928.

[30] Foreign Application Priority Data

Dec. 22, 1993 [DE] Germany .................. 43 43 802 4
Jun. 29, 1994 [DE] Germany .................. 44 22 732 9

[51] Int. Cl.⁶ .................. F16D 3/80; B60K 17/02; F16F 15/16; F16F 15/12
[52] U.S. Cl. .................. 475/347; 192/70.17; 74/574
[58] Field of Search .................. 74/574; 475/346, 475/347; 192/70.17

[56] References Cited

U.S. PATENT DOCUMENTS

| | | | |
|---|---|---|---|
| 4,573,374 | 3/1986 | Koshimo et al. | 74/574 |
| 4,676,121 | 6/1987 | Kouno | |
| 5,551,928 | 9/1996 | Sudau | 475/347 |
| 5,634,866 | 6/1997 | Sudau | 475/347 |

FOREIGN PATENT DOCUMENTS

| | | |
|---|---|---|
| 0041708 | 12/1981 | European Pat. Off. |
| 3139658 | 4/1983 | Germany |
| 3423210 | 4/1985 | Germany |
| 3630398 | 5/1987 | Germany |
| 3612583 | 10/1987 | Germany |
| 3624496 | 1/1988 | Germany |
| 3624498 | 1/1988 | Germany |
| 3834284 | 4/1990 | Germany |
| 3926384 | 2/1991 | Germany |
| 3934798 | 4/1991 | Germany |
| 4128868 | 3/1993 | Germany |
| 58-109745 | 6/1983 | Japan |

*Primary Examiner*—Dirk Wright
*Attorney, Agent, or Firm*—Nils H. Ljungman and Associates

[57] ABSTRACT

A torsional vibration damper is designed with a driving-side transmission element, with at least one planet carrier which can rotate relative to the transmission element and which planet carrier is provided with at least one plane wheel which is engaged on one hand with a sun gear and on the other hand with a ring gear, and with a driven-side transmission element. One of the transmission elements has control means for a spring device. There are centrifugal masses corresponding respectively to the driving-side transmission element and to the driven-side transmission element, at least one of which centrifugal masses is connected by means of the spring device to at least one element of the planetary gearset which acts as an intermediate mass, whereby the intermediate mass can be driven in a movement which is a function of the speed and direction of rotation of the two centrifugal masses with respect to one another.

20 Claims, 10 Drawing Sheets

TORSIONAL VIBRATION DAMPER WITH A PLANETARY GEARSET

This is a divisional of U.S. Ser. No. 08/665,465, filed Jun. 18, 1996, now U.S. Pat. No. 5,634,866, which claims divisional status from U.S. Ser. No. 358,697, now U.S. Pat. No. 5,551,928, issued Sep. 3, 1996, which claims priority from Fed. Rep. of Germany Patent Application Nos. P 44 22 732.9, filed Jun. 29, 1994, land P 43 43 802.4, filed Dec. 22, 1993.

BACKGROUND OF THE INVENTION

1. Field of the Invention

This invention relates to a torsional vibration damper, in particular for clutches on motor vehicles, with a driving-side transmission element with at least one sun gear which can rotate relative to the transmission element and is provided with at least one planet wheel which is engaged on one hand with a sun gear and on the other hand with a ring gear, and with a driven-side transmission element, whereby one of the transmission elements has actuating means for a spring device.

2. Background Information

German Patent No. 31 39 658 C2, FIGS. 3 and 4 in particular, appears to disclose a torsional vibration damper with a driving-side transmission element in the form of a lining carrier, which lining carrier is rigidly connected to a sun gear of a planetary gearset located on a hub, the hub acting as a driven-side transmission element. The planetary gearset has a planet carrier which is capable of executing a limited rotation relative to the lining carrier. The planet carrier is fastened to the hub, and the planet wheels are mounted on the planet carrier. The planet wheels are engaged, on one hand, with the sun gear and, on the other hand, with a ring gear fastened to the cover plate for the hub, which cover plate can rotate relative to the hub. The cover plates each have respective recesses for a spring device, which recesses are bordered by stop edges, or fitting edges, or stop surfaces, for the respective spring device.

In the torsional vibration damper described immediately above, a torque, generated by a drive mechanism, is introduced to the sun gear via the lining carrier. When the planet wheels are rolling, torque fluctuations cause a relative rotation of the planet carrier and ring gear with respect to one another, which relative rotation causes a change in the position of the cover plates with respect to the hub, thereby deforming the spring devices.

By means of an appropriate selection of the translation ratio, transformation ratio, gear ratio, or transmission ratio, on the planetary gearset, the angle of rotation for the deformation of the spring elements can be changed, in contrast to a torsional vibration damper without a planetary gearset, and thus the disruptive influence of torque fluctuations can be reduced. On account of the low mass moment of inertia on the driven-side in such torsional vibration dampers, however, the ability to absorb rather large fluctuations of the torque is limited.

To be able to absorb rather large torque fluctuations, a fly-wheel with two centrifugal masses of the type disclosed in German Pat. No. 36 30 398 C2, for example, has apparently turned out to be advantageous. On that flywheel, a spring device is located between a driving-side centrifugal mass and a driven-side centrifugal mass, and this spring device makes possible a relative movement of the two centrifugal masses with respect to one another. On such two-mass flywheels, introduced torques are transmitted to the driven side, but without translation, transmission, or conversion, in the torsional vibration damper.

OBJECT OF THE INVENTION

The object of the invention is to design a torsional vibration damper so that it can transmit torques with a specified, or predetermined, translation and also reduce large fluctuations in torque.

SUMMARY OF THE INVENTION

The invention teaches that this object can be achieved by both the driving-side transmission element and the driven-side transmission element each having a centrifugal mass, at least one of which is preferably connected by means of the spring device to at least one element (sun gear, planet carrier, ring gear) which acts as an intermediate mass, whereby the intermediate mass can be driven in a movement which is a function of the speed and direction of rotation of the two centrifugal masses in relation to one another.

The configuration of the torsional vibration damper with a driving-side and a driven-side centrifugal mass, and an element of a planetary transmission (e.g. the sun gear, planet carrier or the ring gear), called the intermediate mass, connected to at least one of the two centrifugal masses, can essentially achieve the following effect:

If a torque is introduced on one of the centrifugal masses, which torque then triggers a relative motion of this centrifugal mass with respect to the other centrifugal mass, a first partial moment can then preferably be transmitted to the other centrifugal mass, but a second partial moment can preferably be transmitted to the intermediate mass, whereby these partial moments, with respect to their amount and effective direction, are preferably a function of the configuration of the planetary gearset and of the connection of the planetary gearset to the centrifugal masses. It is also possible that each of these partial moments will be greater than the torque introduced, but on account of the arrangement of the spring device claimed by the invention between two masses (centrifugal masses or intermediate mass), the two partial moments can counteract one another as a result of the deformation of the spring device with different excursion angles. Consequently, the torque delivered can, still, of course, be on the order of magnitude of the torque introduced, but, on account of the deformation of the spring (which causes a smoothing of the curve of the moment), it can be transmitted to a downstream gearset with practically no torque fluctuations. Large torques can thereby result in a small difference between the speed of the intermediate mass and the driven-side centrifugal mass, so that on the spring device, which is preferably engaged on one hand on the intermediate mass and on the other hand on one of the two centrifugal masses, only a relatively small deformation occurs. The inertia caused by the masses has an apparently small effect, on account of the large partial moments. On the other hand, as a result of the corresponding design of the torsional vibration damper, small partial moments on the intermediate mass and on the respective output-side centrifugal mass can preferably result in a large difference in speed. In turn, the large difference in speed can preferably result in a significant deformation of the spring device and can have the effect of an apparently large momentum of the masses which are engaged with the spring device.

With a knowledge of the above factors, the planetary gearset and the connection of the intermediate mass to at least one of the two centrifugal masses can desirably be designed so that a sudden change in the torque absorbed on the driving-side is damped as much as possible and is transmitted in turn to the driven-side centrifugal mass. Which centrifugal mass is the driving-side mass and which is the driven-side mass can preferably be determined by the respective installation position of the torsional vibration damper.

In the event of a change from one of the possible types of operation to the other, i.e. from traction operation to thrust operation, there is preferably a change of the translation ratio, since the latter is determined by the number of teeth of the sun gear and of the ring gear in relation to one another.

Disclosed herebelow are preferred embodiments of a connection of the intermediate mass to at least one of the two centrifugal masses, as well as of the interaction of the intermediate mass with the corresponding centrifugal mass by means of the spring device. Particularly, in this case, the spring device can preferably be located on the driven side, i.e. it is preferably engaged between the driven-side centrifugal mass and the intermediate mass, although it can also be provided on the driving side, whereby it is preferably inserted between the intermediate mass and the driving-side centrifugal mass. The spring device can also be engaged between the two centrifugal masses, whereby the intermediate mass can preferably be connected to both centrifugal masses or can preferably be engaged with only one of the centrifugal masses.

Advantageous refinements of the design of the above-mentioned embodiments are disclosed hereinbelow. Particularly, as explained further above, when a torque is introduced, the gear wheels of the planetary gearset can preferably develop a relative velocity with respect to one another as a function of the levels of the partial moments which result from the design of the planetary gearset and of their connection to the at least one centrifugal mass. With high partial moments, this relative velocity can be so low that the elements of the planetary gearset can be located outside a chamber which surrounds the spring device and is at least partly filled with pasty medium (such as in a recess), since on account of the low relative velocity of the gear wheels to one another, the pasty medium displaced between their teeth need only compensate for a negligibly small damping action.

In contrast, at higher relative velocities, it may be appropriate to locate the elements of the planetary gearset, together with the spring device, in the chamber which is at least partly filled with the pasty medium. As disclosed herebelow, this chamber can preferably be located in one of the two centrifugal masses, so that an influence, on the sealing of the chamber, of the relative motion between the driving-side centrifugal mass and the driven-side centrifugal mass, can be excluded. By filling the chamber with pasty medium, a damping can be achieved which is a function of the angular velocity of the planet wheel in relation to the ring gear or to the sun gear, since the gear wheels, as they roll against one another, preferably displace the medium, in the axial direction, between the edges of the teeth.

Another advantageous embodiment of the torsional vibration damper contemplated by the present invention is disclosed herebelow in which, as a result of the location of planet carriers on both sides of the planet wheels, an additional function can be achieved. Particularly, the additional function is a coarse sealing of the gear wheel space and of the space available to the spring device to prevent the escape of the pasty medium, whereby the planet carriers can preferably act as axial partitions which are pulled radially far inward, to prevent an escape of the medium in this area. A more precise seal is achieved by the ring disclosed herebelow, which also guarantees that the ring gear is firmly connected to the corresponding centrifugal mass.

The planet carrier preferably provides radial support for the gear wheels. Disclosed herebelow is a measure which guarantees the axial position of the planet carrier in the chamber of the corresponding centrifugal mass. Also disclosed herebelow is an advantageous embodiment for this purpose.

On account of the planetary gearset, the torsional vibration damper contemplated by at least one preferred embodiment of the present invention has a considerable number of points at which parts are subjected to a relative movement with respect to one another, so that these points are suitable for the installation of a friction device. A preferred point for this purpose is disclosed herebelow, as well as a configuration of the planet carrier to actuate the friction device. An advantageous embodiment of this friction device is also disclosed herebelow.

During a translation of the planetary gearset which produces large partial moments, the friction device can preferably have a powerful, precisely-adjustable plate spring. In the event of small partial moments with large angular velocities, and with a weak plate spring which is more difficult to adjust precisely, the friction distance is essentially longer.

Disclosed herebelow is an advantageous embodiment of one of the centrifugal masses, whereby it becomes possible on one hand to move the spring device in the damping, pasty medium, and on the other hand, by means of the spring device, to make a connection between the centrifugal mass and one of the elements of the planetary gearset, preferably to the planet carrier. Starting with such a centrifugal mass, further disclosed herebelow is a refinement, according to which the remaining elements of the planetary gearset are located outside the chamber filled with pasty medium, while, as also disclosed herebelow, the chamber can be correspondingly enlarged in the axial direction to hold essentially all the elements of the planetary gearset in the range of action of the damping medium. Also disclosed herebelow is the manner in which such a chamber can be externally sealed to hold the spring device and, if necessary, the planetary gearset.

Disclosed herebelow is an advantageous solution to mount one of the two centrifugal masses on the other centrifugal mass. Also disclosed herebelow is that the centrifugal mass mounted in this manner can preferably be permanently connected to the planet carrier.

As a result of the insertion of the bearing arrangement between at least two of the three different masses, namely the driving-side centrifugal mass, the intermediate mass or the driven-side centrifugal mass, the gear wheels of the planetary gearset can engage one another without the balance error which would occur without the use of the bearing, on account of the clearance between the gear teeth. Advantageous possible locations and orientations of the bearing arrangement are also disclosed herebelow. Also disclosed herebelow is a manner in which the bearing arrangement can be secured against axial movements by simple structural means, while also disclosed herebelow is a measure to insulate the bearing arrangement, primarily against the heat which can be generated on the driven-side centrifugal mass used to hold the friction lining.

While one embodiment of a bearing arrangement, as disclosed herebelow, is preferably formed by a roller bearing, another embodiment of a bearing arrangement, as disclosed herebelow, is preferably designed as a friction bearing. Also disclosed herebelow is an advantageous refinement which employs such a friction bearing.

Also disclosed herebelow is a manner in which, on the torsional vibration damper disclosed by the invention, a bearing arrangement can be used which has a particularly small inside diameter, and consequently a small outside diameter.

The above discussed embodiments of the present invention will be described further hereinbelow with reference to the accompanying figures. When the word "invention" is used in this specification, the word "invention" includes "inventions", that is, the plural of "invention". By stating "invention", the Applicant(s) does/do not in any way admit that the present application does not include more than one patentably and non-obviously distinct invention, and maintains that this application may include more than one patentably and non-obviously distinct invention. The Applicant(s) hereby assert(s) that the disclosure of this application may include more than one invention, and, in the event that there is more than one invention, that these inventions may be patentable and non-obvious one with respect to the other.

In summary, one aspect of the invention resides broadly in a torsional vibration damper for a motor vehicle clutch, which torsional vibration damper is for being connected between the motor vehicle clutch and a shaft of the motor vehicle, the torsional vibration damper comprising: a first centrifugal mass; a second centrifugal mass; the first centrifugal mass and the second centrifugal mass having means for being mounted for movement with respect to one another about a common axis of rotation; the first centrifugal mass having means for being connected to a shaft of a motor vehicle; the second centrifugal mass having means for being connected to a motor vehicle clutch; means for transmitting torque between the first centrifugal mass and the second centrifugal mass; spring means for damping torsional vibrations of the first centrifugal mass and the second centrifugal mass with respect to one another; the spring means being engaged between the first centrifugal mass and the second centrifugal mass; the means for transmitting torque comprising intermediate means being engaged between the first centrifugal mass and the second centrifugal mass; the intermediate means comprising means for assisting in the transmission of torque between the first centrifugal mass and the second centrifugal mass and reducing torque fluctuations between the first centrifugal mass and the second centrifugal mass.

Another aspect of the invention resides broadly in a method of operating a torsional vibration damper for a motor vehicle clutch, which torsional vibration damper is for being connected between the motor vehicle clutch and a shaft of the motor vehicle, the torsional vibration damper comprising: a first centrifugal mass; a second centrifugal mass; the first centrifugal mass and the second centrifugal mass having means for being mounted for movement with respect to one another about a common axis of rotation; the first centrifugal mass having means for being connected to a shaft of a motor vehicle; the second centrifugal mass having means for being connected to a motor vehicle clutch; means for transmitting torque between the first centrifugal mass and the second centrifugal mass; spring means for damping torsional vibrations of the first centrifugal mass and the second centrifugal mass with respect to one another; the spring means being engaged between the first centrifugal mass and the second centrifugal mass; the means for transmitting torque comprising intermediate means being engaged between the first centrifugal mass and the second centrifugal mass; the intermediate means comprising means for assisting in the transmission of torque between the first centrifugal mass and the second centrifugal mass and reducing torque fluctuations between the first centrifugal mass and the second centrifugal mass; the method comprising the steps of: providing a first centrifugal mass; providing a second centrifugal mass; configuring the first centrifugal mass and the second centrifugal mass to have means for being mounted for movement with respect to one another about a common axis of rotation; configuring the first centrifugal mass to have means for being connected to a shaft of a motor vehicle; configuring the second centrifugal mass to have means for being connected to a motor vehicle clutch; providing means for transmitting torque between the first centrifugal mass and the second centrifugal mass; providing spring means for damping torsional vibrations of the first centrifugal mass and the second centrifugal mass with respect to one another; engaging the spring means between the first centrifugal mass and the second centrifugal mass; the step of providing means for transmitting torque comprising the step of providing intermediate means and engaging the intermediate means between the first centrifugal mass and the second centrifugal mass; and configuring the intermediate means to comprise means for assisting in the transmission of torque between the first centrifugal mass and the second centrifugal mass and reducing torque fluctuations between the first centrifugal mass and the second centrifugal mass; the method further comprising the additional steps of: connecting the first centrifugal mass to a shaft of a motor vehicle; connecting the second centrifugal mass to a motor vehicle clutch; transmitting torque between the first centrifugal mass and the second centrifugal mass; damping, with the spring means, torsional vibrations of the first centrifugal mass and the second centrifugal mass with respect to one another; and assisting the transmission of torque between the first centrifugal mass and the second centrifugal mass, and reducing torque fluctuations between the first centrifugal mass and the second centrifugal mass, with the intermediate means.

BRIEF DESCRIPTION OF THE DRAWINGS

The invention is explained in greater detail below with reference to the accompanying drawings, wherein.

DESCRIPTION OF THE PREFERRED EMBODIMENT

Figure 1:
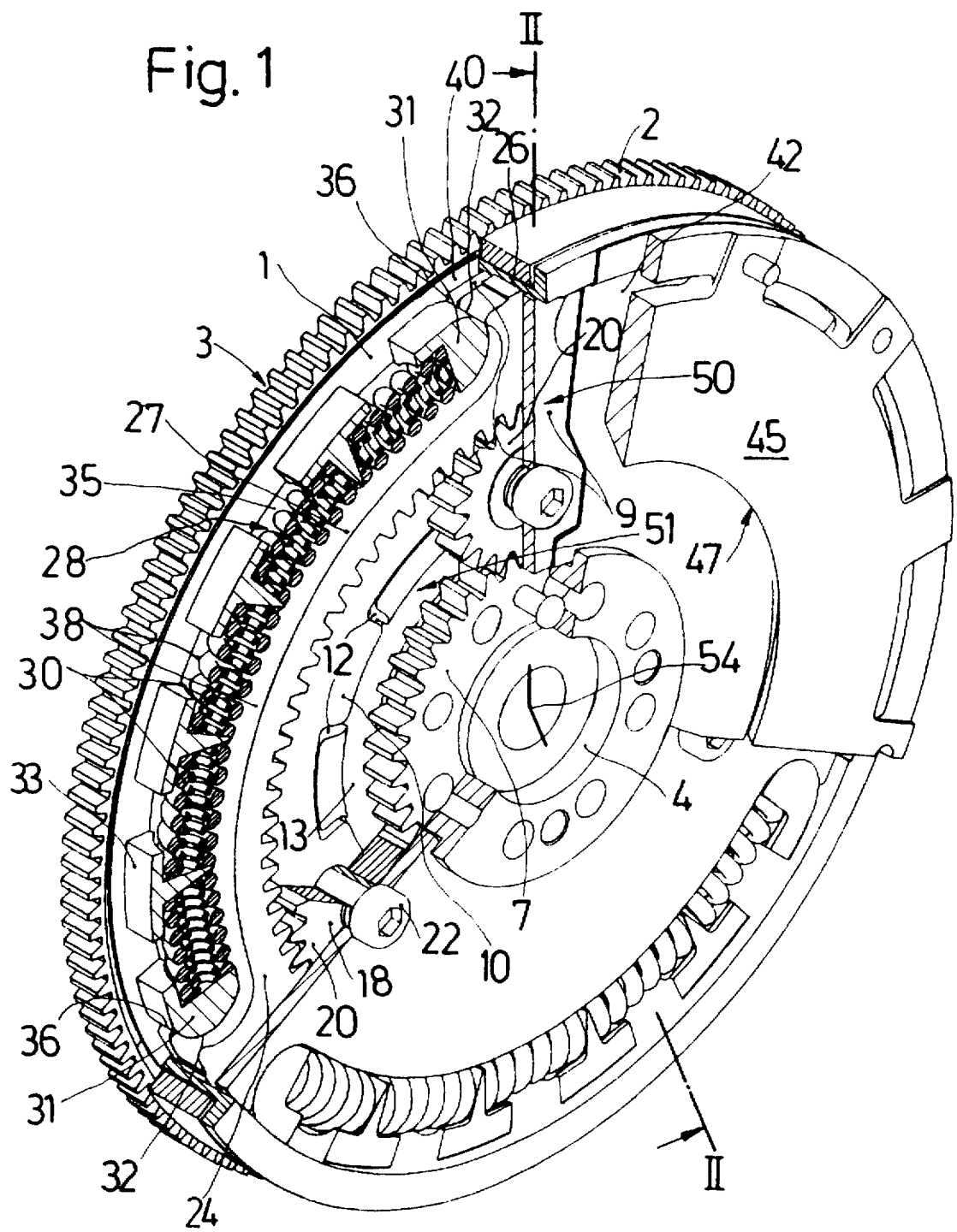
FIG. 1 shows a view in perspective of a torsional vibration damper with a planetary gearset located at least partly in a chamber filled with pasty medium, and an output-side spring device, in partial cross section.
Figure 2:
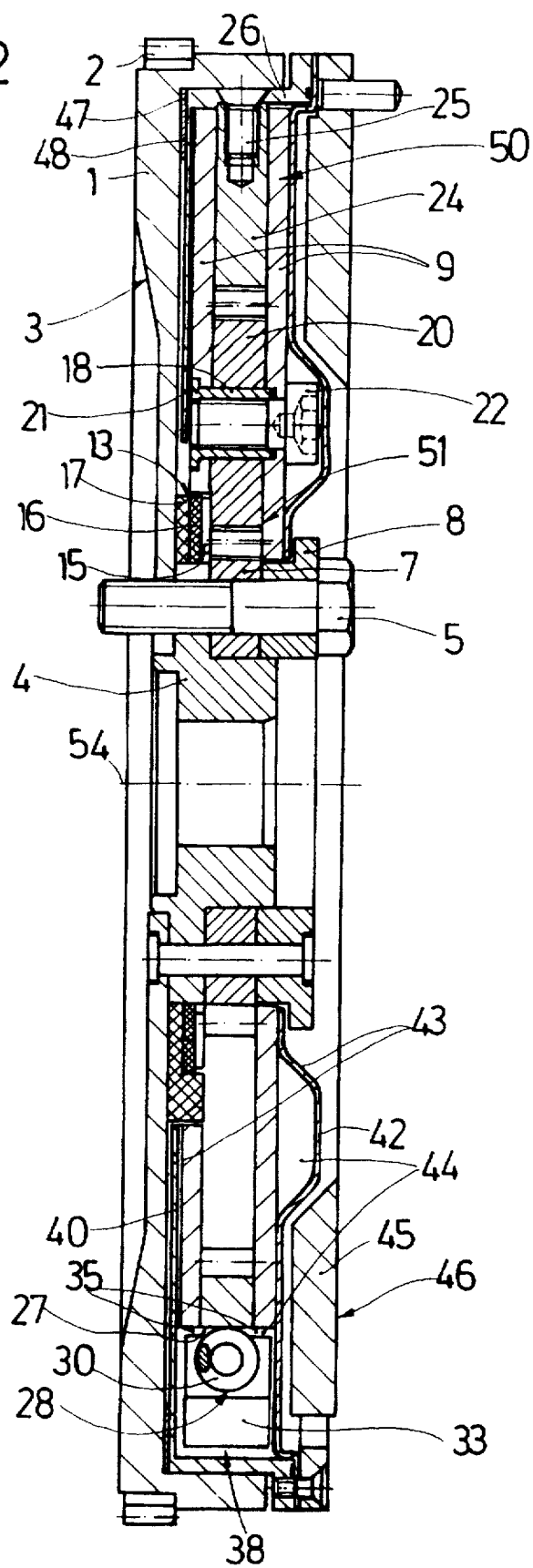
FIG. 2 shows a cross section along Line II—II in FIG. 1.

FIGS. 1 and 2 show a torsional vibration damper which, on its left side as shown in FIG. 2, has a centrifugal mass 1. The centrifugal mass 1 is essentially used to introduce a drive motion, and is preferably provided in its circumferential region with a toothed ring 2 for a starter pinion (not shown). The centrifugal mass 1 preferably acts as the driving-side transmission element 3.

The centrifugal mass 1 is preferably fastened by means of screws 5 to: a hub 4, which hub is preferably located on a crankshaft (not shown) of an internal combustion engine; a sun gear 7 which is also preferably located on the hub and is preferably part of a planetary gearset; and a flange 8. The planetary gearset preferably has two planet carriers 9 located on both sides of the sun gear 7, and the two planet carriers 9 preferably act as intermediate masses 50. The planet carrier 9 shown on the right in FIG. 2 extends radially inward to the flange 8, while the planet carrier 9 on the left has projections 10 (see FIG. 1) on its radially inner end. The projections 10 are preferably engaged, with clearance in the circumferential direction, in recesses 12 of a friction device 13. Viewed in the axial direction, friction device 13 can preferably be located between the driving-side centrifugal mass 1 and the sun gear 7, and can preferably be formed by a spring plate 15, an intermediate ring 16 and a friction disc 17.

The two planet carriers 9 are preferably connected to one another in the axial direction by a plurality of bushings 18 located on the same diameter, or radius, and a planet wheel 20 located between the two planet carriers 9 is preferably rotationally mounted in, or on, each of the bushings 18. The bushings 18, pointing toward the axial connection of the two planet carriers 9, each preferably have an expanded, flange-like portion 21 on their sides facing the centrifugal mass 1, and are each preferably provided with an internal thread for the insertion of a screw 22, the head of which screw preferably comes into contact with the planet carrier 9 farther from the centrifugal mass 1 on the side of the planet carrier 9 away from the centrifugal mass 1. The planet wheels 20 are preferably engaged, on one hand, with the sun gear 7 and, on the other hand, with a ring gear 24 which is also located between the two planet carriers 9. The ring gear 24 is preferably fastened by means of screws 25 to a ring 26 which surrounds both the planet carriers 9 and the ring gear 24 in the circumferential region.

The ring gear 24, radially outside its toothed engagement with the planet wheels 20, preferably has recesses 27 which are at predetermined angular distances from one another, into each of which recesses a spring device 28 is preferably inserted. As shown in FIG. 1, this spring device 28 preferably has a number of springs 30, the outermost of which springs preferably come in contact via a stop element 31 against respective stop edges 32 of the ring gear 24. The individual springs 30 are preferably separated from one another by sliding blocks 33 which are guided on the inside of the ring 26. The spring device 28 is preferably engaged in the axial direction on both sides of the ring gear 24 in corresponding recesses 35 of the planet carriers 9, whereby the stop elements 31 are preferably in contact with stop edges 36 of the planet carriers 9.

A passage 38 is preferably formed by a recess 27 in the ring gear 24 and the corresponding recesses 35 in the planet carriers 9, to locate the spring device 28. The latter, on its side facing the centrifugal mass 1, is preferably closed in the axial direction by a first sealing plate 40, which is preferably designed as one piece with the ring 26 and extends radially inward into the vicinity of the friction device 13. The opposite side of the passage 38, viewed in the axial direction, is preferably closed by a sealing plate 42 which is fastened to the ring 26 and extends radially inward to the flange 8. The ring 26, together with the sealing plates 40 and 42, preferably forms a seal 43 for a chamber 44 which is located in an additional centrifugal mass 45. Chamber 44 preferably holds the planet carriers 9, the gear wheels 7, 20 and 24 and the spring device 28, and is preferably filled with a pasty medium. The additional centrifugal mass 45 is preferably permanently connected to the ring 26 and acts as the driven-side transmission element 46, which is preferably provided, in a manner not shown, to hold friction linings of a clutch.

The planet carriers 9 and the gear wheels 7, 20 and 24 located between them are preferably secured both in the radial direction and in the axial direction by the ring 26 which interacts with the sealing plates 40, 42. There is preferably a friction ring 48 which acts as an axial retainer 47 for the ring 26 between the two centrifugal masses 1 and 45, on the side of the flywheel 1 facing the ring 26. This friction ring 48, in addition to its function indicated above, also preferably provides a basic friction for the torsional vibration damper, whereby the level of this basic friction can preferably be a function of the distance of the friction ring 48 from the axis of rotation 54 of the torsional vibration damper.

The torsional vibration damper can preferably work as follows:

When a torque is introduced to the driving-side centrifugal mass 1, the resulting motion can preferably be transmitted to the sun gear 7 which, on account of its geared engagement with the planet wheels 20, drives the planet wheels 20. Since the ring gear 24 initially acts non-rotationally, the motion of the sun gear 7 is essentially converted into a rotation of the planet wheels 20 around the respective bushings 18 and into a motion of the bushings 18 themselves, and thus of the planet carriers 9, around the axis of rotation 54. The driving-side torque can thereby essentially be divided into components, namely:

a first partial moment which is transmitted via the planet wheels 20 to the planet carrier 9 which acts as an intermediate mass 50; and a second partial moment which is transmitted to the ring gear 24.

If the torque introduced at the sun gear 7 is oriented in the clockwise direction, as illustrated by way of example in FIG. 1, then a first partial moment which acts in the counterclockwise direction essentially results in the rotation of the planet wheels 20, while the planet carriers 9 are essentially driven by a second partial moment which acts in the counterclockwise direction. The partial moments which counteract one another, as a function of the translation of the planetary gearset, can essentially be greater than the driving-side torque, but if they are superimposed on one another, they can essentially result in a driven-side torque on the ring gear 24 which equals the driving-side torque minus the losses which occur in the torsional vibration damper. The driven-side torque, however, in contrast to the driving-side torque, can essentially be largely free of sudden changes in moment, since the spring device 28 located between the planet carrier 9 acting as the intermediate mass 50 and the spring device 28 located on the ring gear 24, on account of its deformation, can essentially produce an excursion of the above-mentioned elements 9 and 24 of the planetary gearset at different angles.

The spring device 28 can thereby preferably function as follows:

The movement of the planet carriers 9, relative to the ring gear 24, resulting from the torque introduced on the driving side, can essentially cause the stop elements 31 of the spring device 28 in contact with the stop edges 32 of the planet carriers 9 to separate from their seats on the stop edges 36 of the ring gear 24. This can essentially cause a deformation of the springs 30, and consequently a movement of the sliding blocks 33 along their guide track in the passage 38 on the inside of the ring 26. The amount of the deformation distance of the spring device 28 is thereby essentially a function of the translation ratio of the planetary gearset and thus of the ratio between the number of teeth of the sun gear 7 and the ring gear 24.

Since the chamber 44 in the driven-side centrifugal mass 45 bordered by the seal plates 40, 42 and the ring 26 is preferably filled with a pasty medium, during the above-mentioned rolling motion of the planet wheels between the sun gear and the ring gear 24 and the deformation of the spring device 28 inside the passage 38, the pasty medium is essentially displaced, whereby the medium is pushed outward in the axial direction in the vicinity of the gear teeth during the engagement of two teeth, where the medium encounters the inside of the planet carrier 9 and, on account of the rotational motion of the torsional vibration damper, is essentially discharged radially outward. In the passage 38, during the deformation of the springs 30 and the resulting movement of the sliding blocks 33 closer to one another, the pasty medium can also essentially be pushed out toward the insides of the planet carrier 9. As the excursion velocity of the planet carriers 9 increases, the displacement velocity of the pasty medium also essentially increases, both between the gear teeth and in the vicinity of the passage 38, but the resistance which the medium exerts against this displacement also increases. Consequently, the damping caused by the medium is essentially a function of the respective angular velocity with which the planet carriers 9 are moved relative to the ring gear 24.

However, the following should be noted with regard to this damping, which is essentially proportional to the velocity:

When the planetary gearset is designed for high partial moments, the phase during which the ring gear 24 is initially stationary is essentially very short, so that only a relatively small angular excursion of the planet carriers 9 is essentially required until drive occurs. The angular velocity of the planet wheels 20 is essentially correspondingly low, so that the damping caused by the pasty medium becomes very small. Consequently, for such a design of the planetary gearset, one conceivable solution is to have the ring gear 24 and the planet wheels 20 located outside the chamber 44 in a recess 51 provided for that purpose.

As soon as the planet carriers 9 have been moved, with a deformation of the spring device 28, by an angle of rotation with respect to the ring gear 24, the magnitude of which angle of rotation can essentially equal the width of the clearance which remains between the projections 10 formed radially inward on the planet carrier 9 shown on the left in FIG. 2 and the respective notch 12 of the friction device 13, as the excursion of the planet carriers continues, the friction plate 17 is driven. On account of the relative motion which now exists between the friction plate 17 and the driving-side centrifugal mass 1, there can essentially be a friction which decelerates the excursion motion of the planet carrier 9. In this case, the amount of this friction can also be influenced by the design of the planetary gearset, since a translation which favors large excursion angles of the planet carriers 9 with respect to the first centrifugal mass 1 can essentially create a large friction distance, while with a translation which creates large partial moments, the friction force can be more accurately tuned when a strong plate spring 15 is used.

The friction ring 48 which acts on the sealing plate 40 of the ring 26, and which is provided on the corresponding side of the driving-side centrifugal mass 1, is essentially continuously active.

The behavior of the torsional vibration damper during traction operation has been described up to this point. For thrust operation, the direction of the motion transmitted essentially changes, so that the motion is preferably transmitted via the driven-side centrifugal mass 45 and the ring 26 to the ring gear 24, and from the ring gear 24 via the planet wheels 20 to the sun gear 7. The sun gear 7 now can preferably act in a stationary manner, and can preferably transmit the aforementioned motion to the driving-side centrifugal mass 1. In this context, it should be noted that on account of the different number of teeth on the ring gear 24 and the sun gear 7, the internal translation during thrust operation can essentially be different from that during traction operation.

Figure 3:
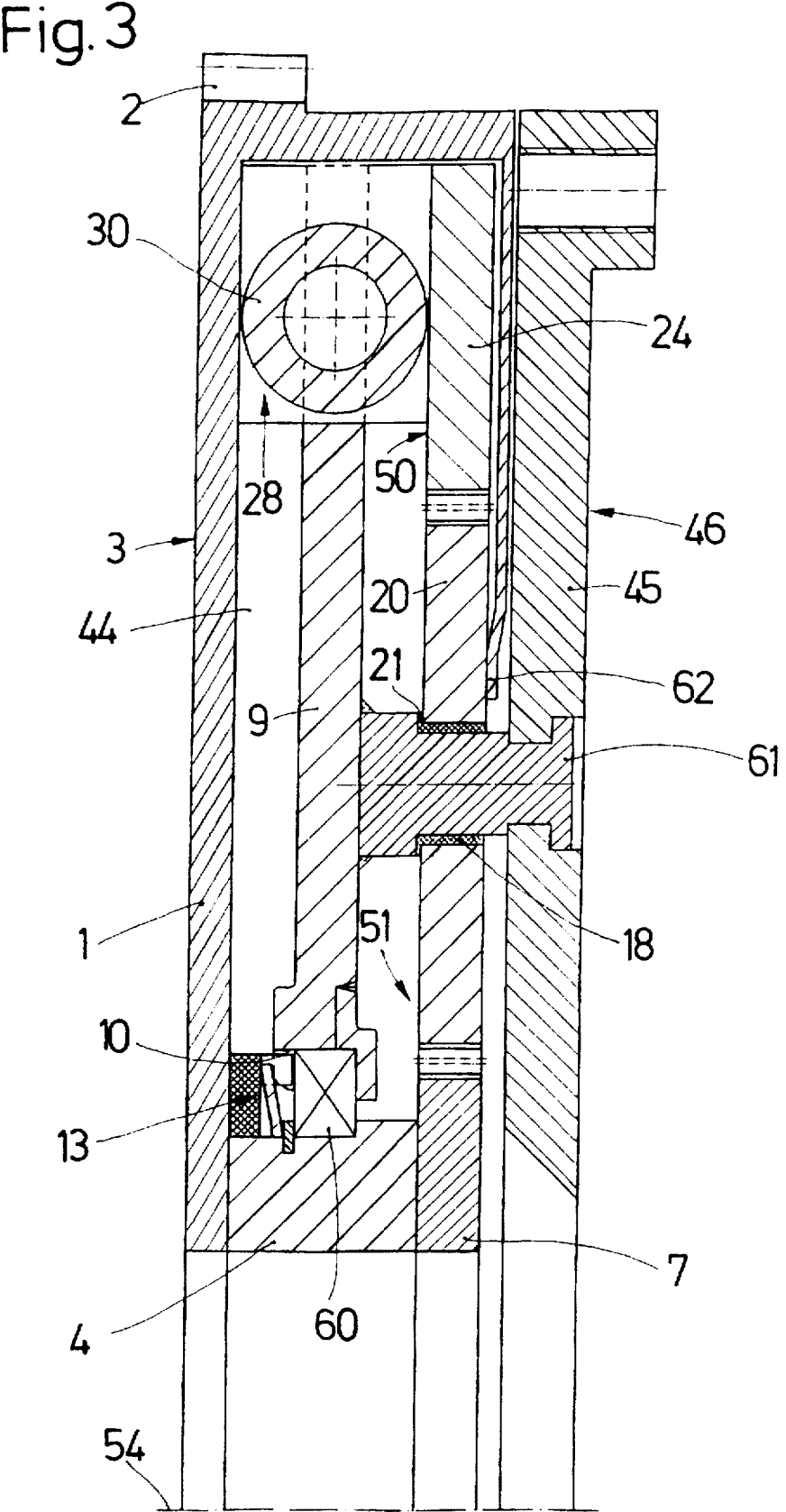
FIG. 3 shows a cross section as in FIG. 2, but showing a planetary gearset located at least partly in the chamber with an input-side spring device.

FIG. 3 illustrates an additional torsional vibration damper which differs primarily from the embodiment described above in that the spring device 28 is located on the driving side, i.e. it connects the driving-side centrifugal mass 1 to the planetary gearset 9, which is located by means of a bearing arrangement 60 on the hub 4, and is preferably fastened by means of pins 61 to the driven-side centrifugal mass 45. The pins 61 preferably support bushings 18, on which bushings the planet wheels 20 are preferably rotationally mounted. The bushings preferably have a radially-expanded portion 21 in the direction of the first centrifugal mass 1, and the respective planet wheel 20 preferably comes into contact with these radially-expanded portions 21 in the axial direction. The planet wheel 20 is preferably held in contact by a wall 62 on the expanded portion 21 of the bushing 18, which wall is preferably located radially outside on the driving-side centrifugal mass 1 and is preferably engaged on the radial inside. The planet wheels are preferably engaged on one hand with the sun gear 7, which is preferably connected by means of the hub 4 to the driving-side centrifugal mass 1, and on the other hand with the ring gear 24. It should also be noted that the torsional vibration damper preferably has at least the friction device 13 illustrated in FIG. 3.

A chamber 44, which is preferably at least partly filled with pasty medium, is formed by the driving-side centrifugal mass 1 in connection with the wall 62. Both the spring device 28 and the planetary gearset are thus preferably located inside this chamber 44, so that the pasty medium can essentially exert a damping action which is proportional to the velocity. The escape of the medium is preferably prevented by the wall 62, which preferably acts as a seal for the chamber 44.

The torsional vibration damper illustrated in FIG. 3 can preferably work as follows: When a torque is introduced to the centrifugal mass 1, the latter can essentially be deflected relative to the driven-side centrifugal mass 45, which essentially causes a first partial moment to be transmitted via the planet wheels 20 to the ring gear 24, and a second partial moment to be transmitted via the pins 61 to the planet carrier 9. The latter partial moment essentially causes a relative motion of the planet carrier 9 with respect to the driving-side centrifugal mass 1, and the spring device 28 is consequently deformed. The second partial moment essentially drives the ring gear 24 which acts as the intermediate mass 50. By superimposing these two partial moments on one another, a resultant driving-side torque is essentially obtained which is transmitted by means of the pins 61 to the driven-side centrifugal mass 45. It is also true for this torsional vibration damper that the direction of action of the driving-side torque is essentially opposite the direction of action of the partial moment on the planet wheels 20 and the ring gear 24, but is directed toward the partial moment of the planet carrier 9. In other words, in accordance with at least one preferred embodiment of the present invention, it can also essentially be true for this torsional vibration damper that the direction of action of the driving-side torque can be opposite the direction of action of the partial moment on the planet wheels 20 and the ring gear 24, but can be directed in the same direction as the partial moment of the planet carrier 9.

Figure 4:
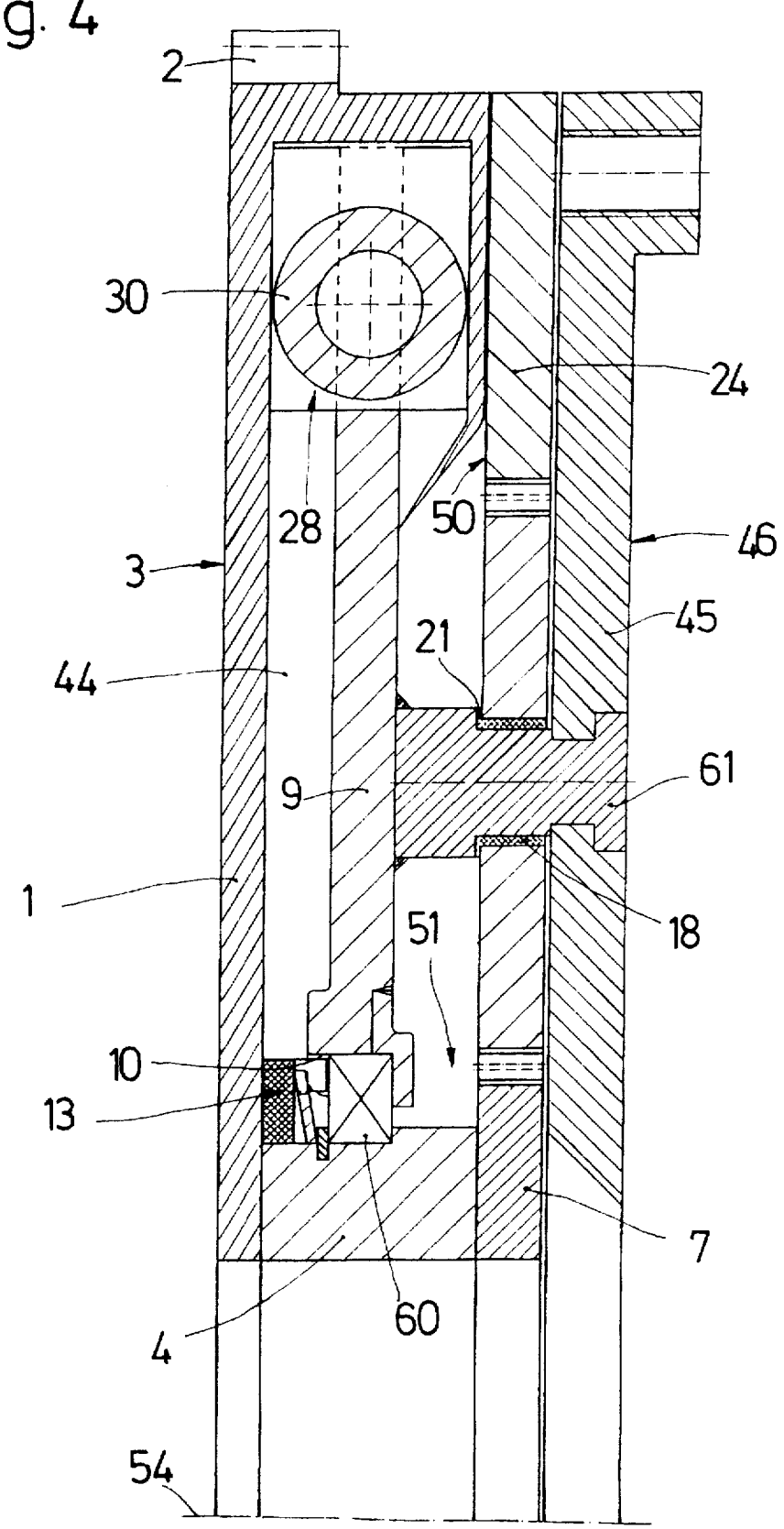
FIG. 4 shows a cross section as in FIG. 3, but with the planetary gearset located outside the chamber.

The torsional vibration damper illustrated in FIG. 4 is essentially the same as the one illustrated in FIG. 3, with the exception that the axial length of the chamber 44 is essentially just large enough that there is space for the spring device 28, but not for the gear wheels of the planetary gearset in the chamber 44. The planet wheels 20 and the ring gear 24 are preferably located axially outside the chamber 44 and thus outside the driving-side centrifugal mass 1 in a recess 51. This design of the torsional vibration damper can be appropriate when, on account of low angular velocities between the individual gear wheels of the planetary gearset, a damping which is proportional to the velocity using a pasty medium, such a pasty medium being located between the teeth of the individual gear wheels, would not be of great benefit. Likewise, as on the torsional vibration damper described above, the parts of the torsional vibration damper which are identical to the embodiment described in FIGS. 1 and 2 are designated by the same reference numbers.

Figure 5:
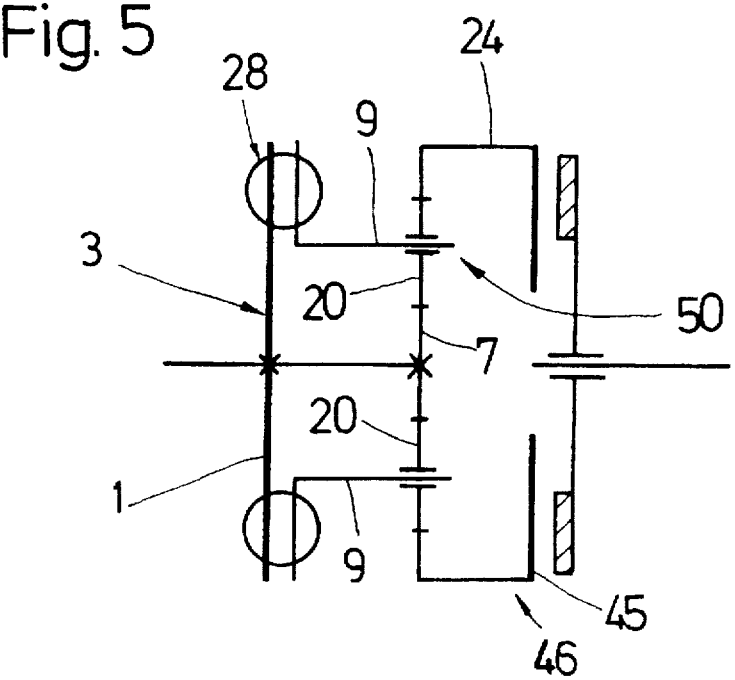
FIG. 5 shows a schematic diagram of a planetary gearset with a driving-side spring device between the driving-side centrifugal mass and planet carriers.

Additional torsional vibration dampers are schematically illustrated in FIGS. 5 to 8. FIG. 5 shows the spring device 28 located on the driving side, whereby it can be actuated on one hand by the driving-side centrifugal mass 1, and on the other hand by the planet carriers 9. The planet carriers 9 are preferably used to hold the planet wheels 20, which planet wheels 20 are preferably engaged:

radially inwardly on the sun gear 7, which is fastened to the driving-side centrifugal mass 1; and radially outwardly on the ring gear, which is connected to the driving-side centrifugal mass 45.

The planet carriers 9 in this embodiment can preferably act as an intermediate mass 50, and are preferably accelerated by one of the two partial moments.

Figure 6:
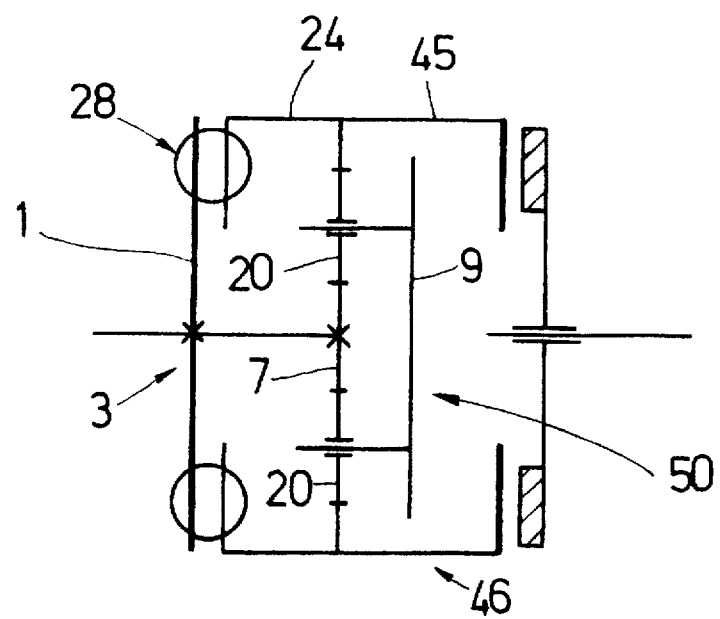
FIG. 6 shows a schematic diagram as in FIG. 5, but with the spring device between the driving-side centrifugal mass and the driven-side centrifugal mass.

The torsional vibration damper illustrated in FIG. 6 also preferably has the spring device 28 on the driving side, whereby this spring device 28 is preferably connected on one hand to the driving-side centrifugal mass 1, but on the other hand to the driven-side ring gear 24. The ring gear 24 is preferably engaged with the planet wheels 20. The planet wheels 20:

preferably roll radially inwardly on the sun gear 7 (which is permanently connected to the driving-side centrifugal mass 1); and by means of their hubs, preferably support the planet carrier 9, which acts as the intermediate mass 50 so that the planet carrier 9 can be accelerated by one of the partial moments.

Figure 7:
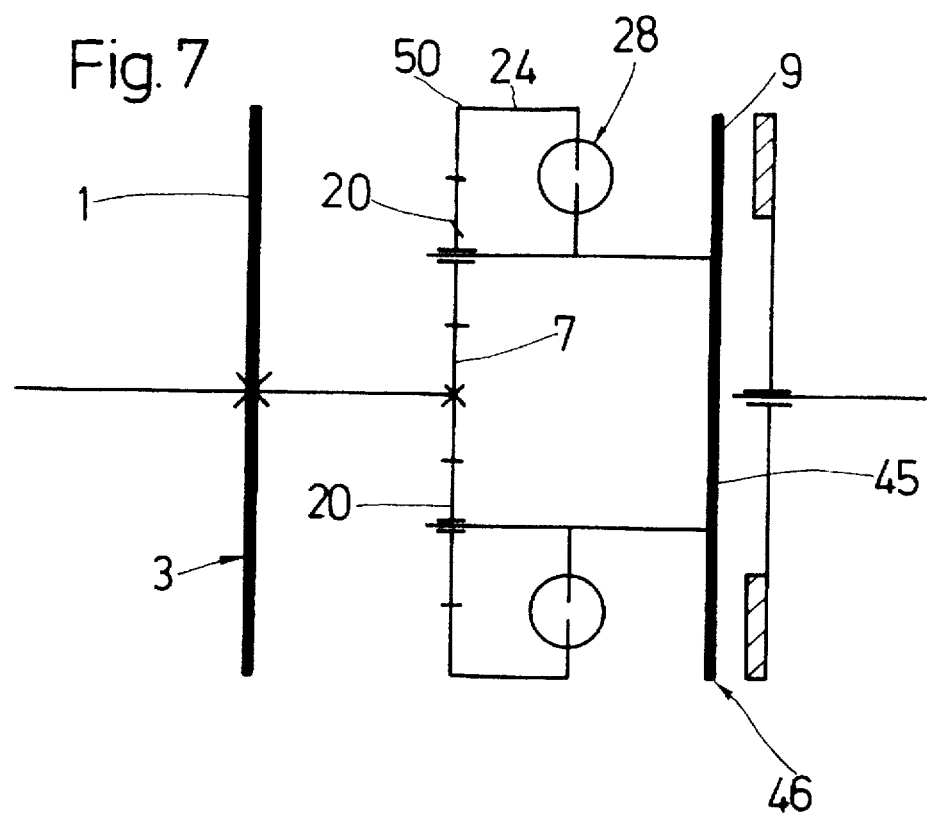
FIG. 7 shows a schematic diagram as in FIG. 5, but with the driven-side spring device between the ring gear and a planet carrier.

In the embodiment of the torsional vibration damper illustrated in FIG. 7, the spring device 28 is preferably located on the driven side and can be acted on, on one hand, by the ring gear 24, but, on the other hand, by the planet carriers 9 which supports the planet wheels 20. In this embodiment, the planet carrier 9 preferably forms the driven-side centrifugal mass 45, while the ring gear 24 preferably acts as the centrifugal mass 50. The sun gear 7, which is engaged radially inward with the planet wheels 20, is preferably fastened to the driving-side centrifugal mass 1.

Figure 8:
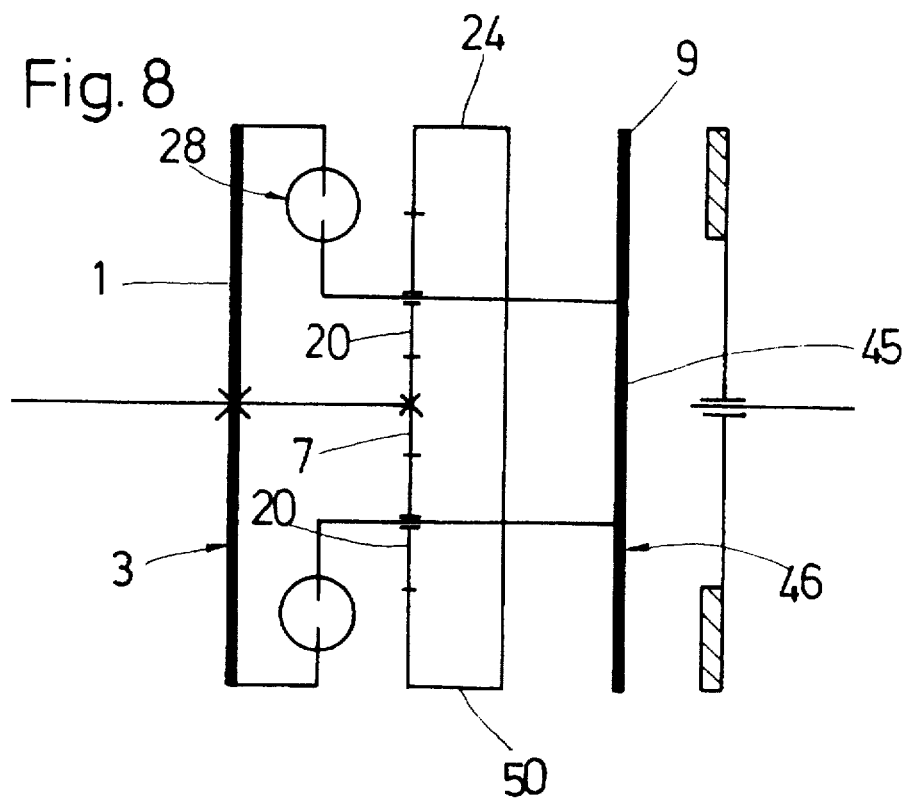
FIG. 8 shows a schematic diagram as in FIG. 5, but where the planet carrier acts as the output-side centrifugal mass.

FIG. 8 shows an additional torsional vibration damper, in which the sun gear 7 is permanently connected to the driving-side centrifugal mass 1. The sun gear 7 is preferably engaged with planet wheels 20, whose planet carrier 9 preferably acts as the driven-side centrifugal mass 45. The planet carrier 9, together with the driving-side centrifugal mass 1, preferably acts on the spring device 28, which in this torsional vibration damper is located on the driving side.

Like FIGS. 1 to 4, which were described in detail, the schematic illustrations in FIGS. 5 to 8 show the schematic operation of the torsional vibration damper with a planetary gearset, where the gear wheels of the planetary gearset and a spring device are preferably located between a driving-side centrifugal mass and a driven-side centrifugal mass. On all these devices, a torque introduced to one of the two centrifugal masses is essentially divided, whereby one partial moment is preferably transmitted to the other centrifugal mass and another partial moment to the respective intermediate mass. The intermediate mass can preferably be formed both by the planet carrier 9 and also by the ring gear 24. An output moment resulting from the two partial moments can then, of course, be transmitted to the driven-side centrifugal mass, but the two partial moments, on account of the spring device, can essentially cause a relative motion of the two masses with respect to one another, so that sudden changes in torque which cause a relative excursion of one of the two centrifugal masses with respect to the other one can essentially be reduced as much as possible.

Figure 9:
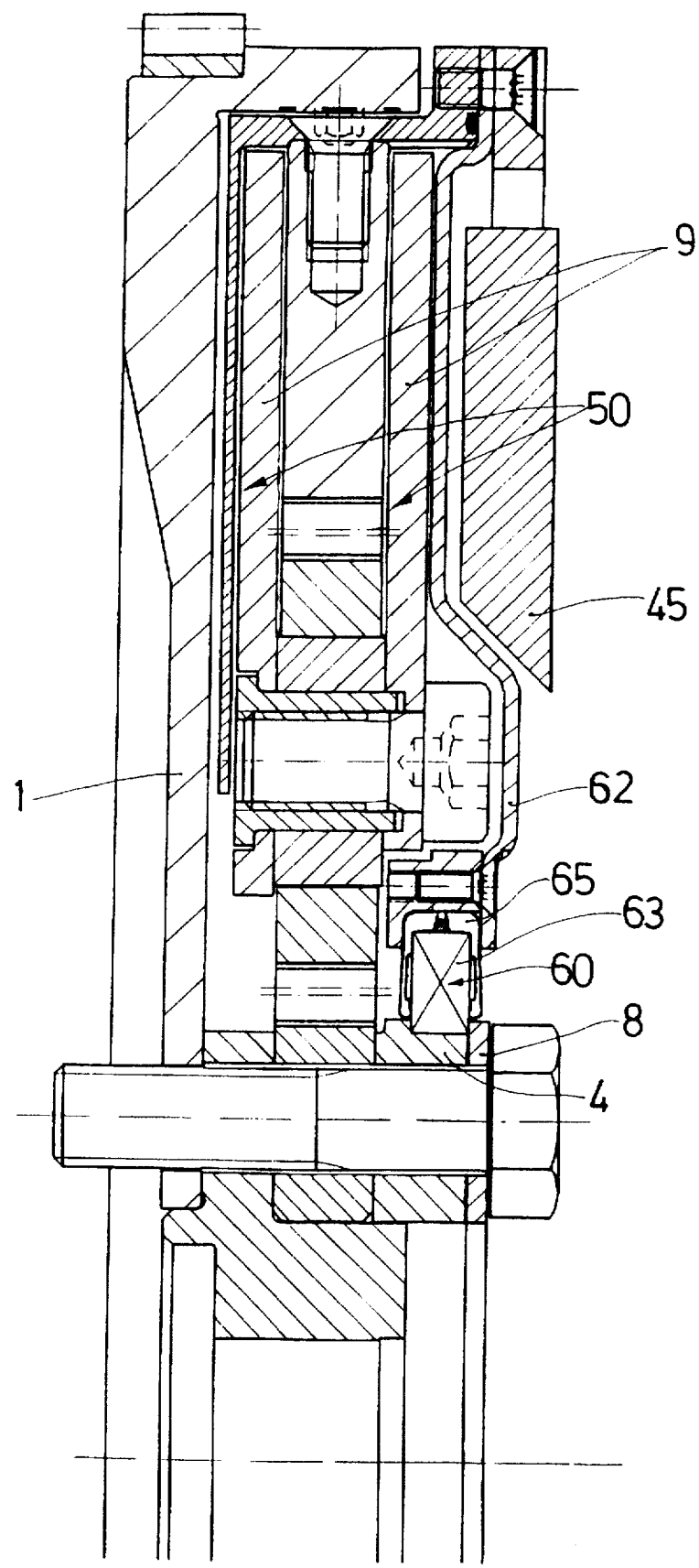
FIG. 9 same as FIG. 2, but with a bearing arrangement between the driving-side centrifugal mass and the driven-side centrifugal mass.
Figure 10:
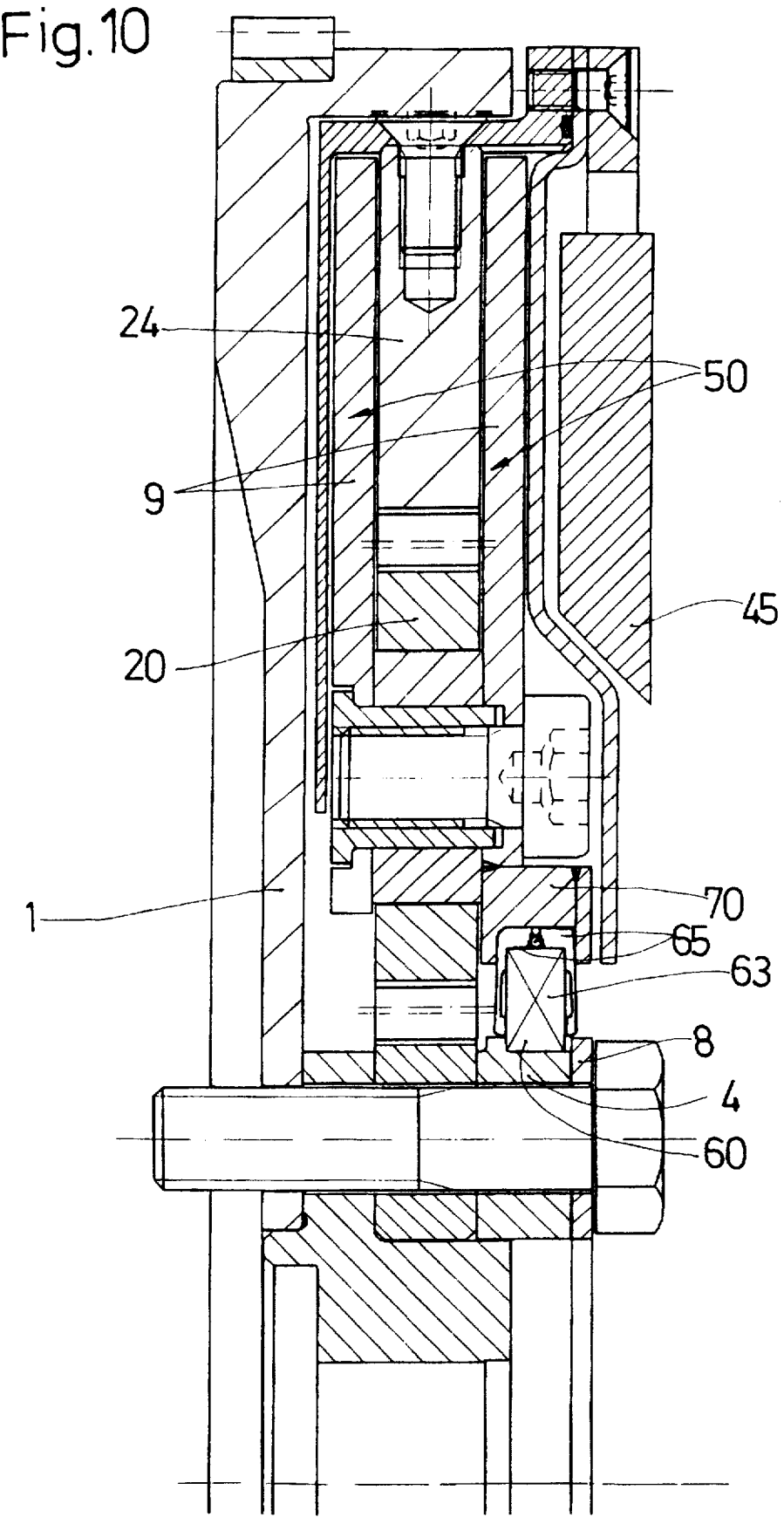
FIG. 10 same as FIG. 9, but with the bearing arrangement between the driving-side centrifugal mass and the planet carrier.
Figure 11:
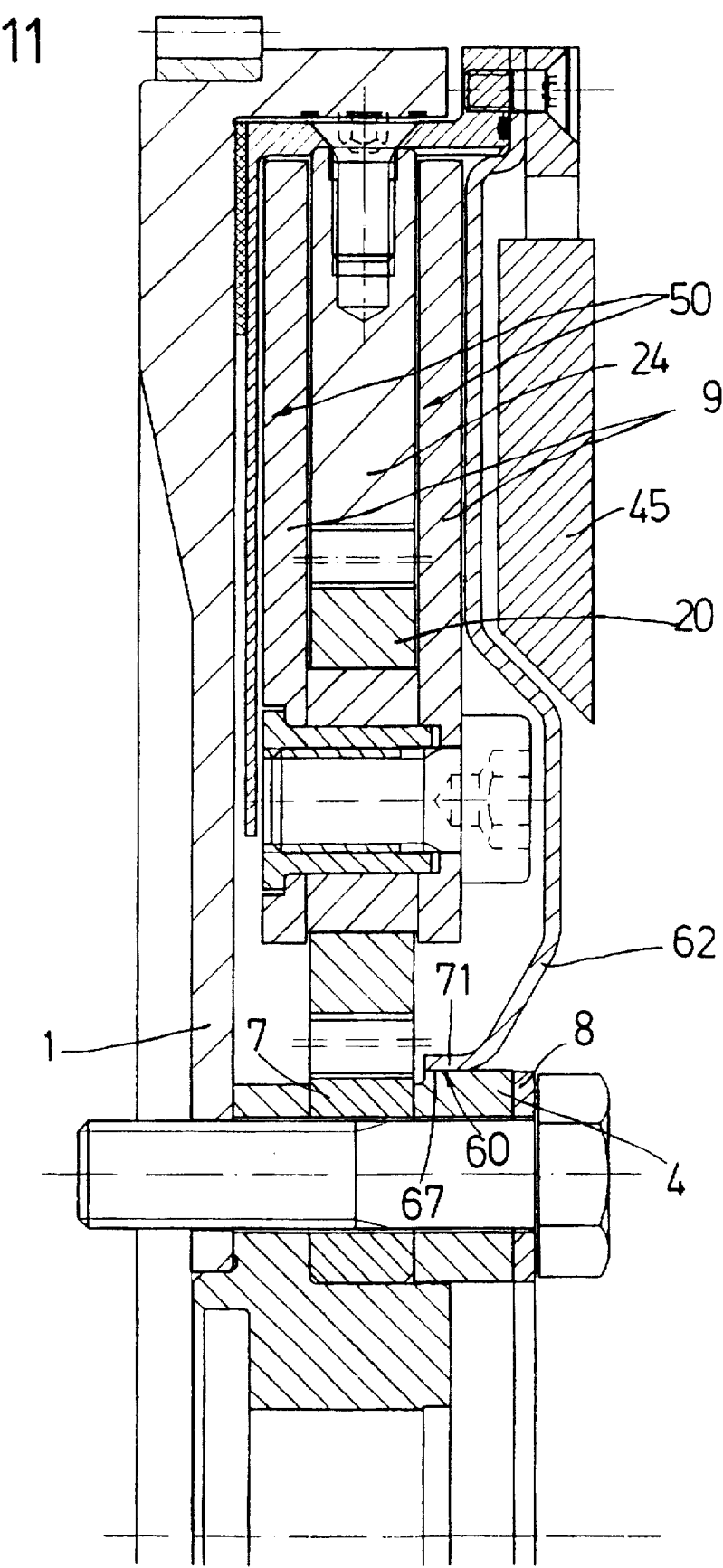
FIG. 11 same as FIG. 2, but with a friction bearing between the driving-side centrifugal mass and the driven-side centrifugal mass.

FIGS. 9–11 illustrate a torsional vibration damper which is primarily the same as the one illustrated in FIG. 2, so that only the differences are described below and identified by means of reference numbers.

As shown in FIG. 9, on the hub 4, there is preferably a bearing arrangement 60 which, on its radial outside, preferably supports insulation plates 65 which have an L-shaped cross section. These insulation plates 65 are preferably designed to protect the bearing arrangement 60, which is in the form of a roller bearing 63, from the heat which is introduced on the driven-side centrifugal mass 45 by friction linings located on the centrifugal mass (but not shown in the figure). The radial outside of the bearing arrangement 60 is preferably held in the free end of a support 62 which is fastened to the driven-side centrifugal mass 45. The roller bearing 63 is preferably secured against movements on its radial inside on one end by the hub 4 and on the other end by the flange 8 in the axial direction. Such a securing action can be achieved on the radial outside by means of the radially inner end of the support 62 which holds the insulation plates 65, and thus the roller bearing 63 held between the insulation plates 65, essentially without play in the axial direction.

As a result of the presence of the bearing 60 between the hub 4 corresponding to the driving-side centrifugal mass 1 and the support 62 fastened to the driven-side centrifugal mass 45, the individual gear wheels, namely the sun gear 7, the planet wheels 20, and the ring gear 24, which individual gear wheels have clearance between the gear teeth, can essentially roll along one another without any balance error.

The embodiment illustrated in FIG. 10 differs from the embodiment illustrated in FIG. 9 in terms of the location of a bearing arrangement 60 which has a roller bearing 63. This bearing arrangement 60 is preferably located on its radial inside on the hub 4 and on its radial outside on an extension 70 of one of the planet carriers 9. As in the embodiment explained above, the bearing arrangement 60 is preferably secured against movements in the axial direction, and preferably absorbs any balance error which occurs during the rolling of the gear wheels 7, 20, 24 along one another.

One particularly simple embodiment of the bearing arrangement 60 is illustrated in FIG. 11, where the support 62 connected to the driven-side centrifugal mass 45 is extended inward until it comes in contact by means of a web 71 on its radially inner end with the hub 4. A metal-to-metal contact therefore essentially exists, but it is also possible to introduce a plastic ring between the web 71 of the support 62 and the hub 4.

Figure 12:
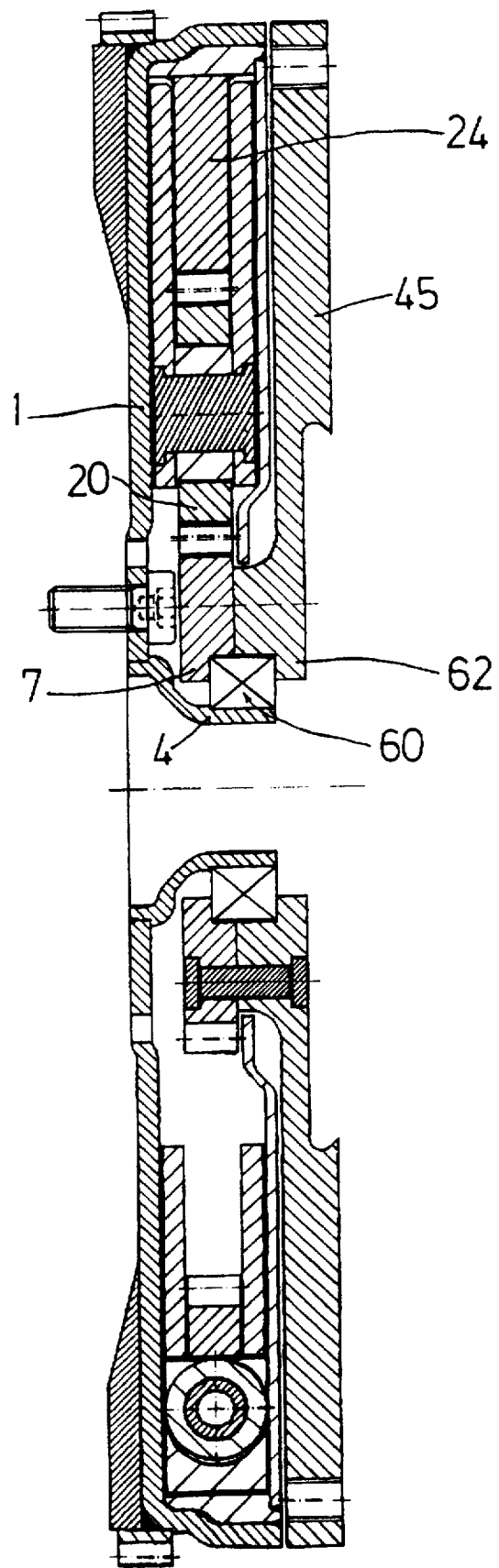
FIG. 12 same as FIG. 9, but with a bearing arrangement which has a small inside diameter.

FIG. 12 illustrates an embodiment in which the design of the hub 4 differs from the hub in the embodiment illustrated in FIG. 2. The hub 4 is preferably designed with a very thin wall and preferably tapers toward the driven-side centrifugal mass 45. The hub, on its tapered end, preferably supports a bearing arrangement 60 which is particularly compact in the radial direction, and is recessed with its radial outside both in the sun gear 7 and also on the driven-side centrifugal mass 45 on its radially inner end. This bearing arrangement 60, which is also secured against movements in the axial direction by the sun gear 7 and the driven-side centrifugal mass, essentially guarantees a uniform radial relative position of the gear wheels 7, 20 and 24 with respect to one another.

It will be appreciated, in accordance with at least one embodiment of the present invention, that the arrangement of planet gears can preferably serve to maximize the moment of inertia from the driving side of the torsional vibration damper. Particularly, owing to their size, the planet gears will conceivably possess a considerable degree of rotational kinetic energy, which could, in accordance with at least one preferred embodiment of the present invention, tend to maximize, or multiply, the moment of inertia experienced at the driven side.

In accordance with at least one preferred embodiment of the present invention, large introduced torques can result in a small difference between the speed of the intermediate mass and the driven-side centrifugal mass, so that on the spring device, which is preferably engaged on one hand on the intermediate mass and on the other hand on one of the two centrifugal masses, essentially only a relatively small deformation occurs.

On the other hand, in accordance with at least one preferred embodiment of the present invention, as a result of the corresponding design of the torsional vibration damper, small partial moments on the intermediate mass and on the respective output-side centrifugal mass can preferably result in a large difference in speed. In turn, the large difference in speed can preferably result in a significant deformation of the spring device and can have the effect of an apparently large momentum of the masses which are engaged with the spring device.

One feature of the invention resides broadly in the torsional vibration damper, in particular for clutches on motor vehicles, with a driving-side transmission element with at least one sun gear which can rotate relative to the transmission element and is provided with at least one planet wheel which is engaged on one hand with a sun gear and on the other hand with a ring gear, and with a driven-side transmission element, whereby one of the transmission elements has actuating means for a spring device, characterized by the fact that both the driving-side transmission element 3 and the driven-side transmission element 46 each have a centrifugal mass 1, 45, at least one of which is connected by means of the spring device 28 to at least one element sun gear 7, planet carrier 9, ring gear 24 which acts as an intermediate mass 50, whereby the intermediate mass 50 can be driven in a movement which is a function of the speed and direction of rotation of the two centrifugal masses 1, 45 in relation to one another.

Another feature of the invention resides broadly in the torsional vibration damper characterized by the fact that one of the two centrifugal masses 1, 45 is in communication via the planet wheel 20 both with the intermediate mass 50 and with the other centrifugal mass 45, whereby the intermediate mass 50 is coupled to one of the centrifugal masses 1, 45 by means of the spring device 28.

Yet another feature of the invention resides broadly in the torsional vibration damper characterized by the fact that one of the two centrifugal masses 1, 45 is connected by means of the spring device 28 to the other centrifugal mass, and like the latter is connected by means of the planet wheel 20 to the intermediate mass 50.

Still another feature of the invention resides broadly in the torsional vibration damper characterized by the fact that one of the two centrifugal masses 1, 45 is engaged by means of the planet wheel 20 with the intermediate mass 50 and by means of the spring device 28 with the other centrifugal mass.

A further feature of the invention resides broadly in the torsional vibration damper characterized by the fact that one of the two centrifugal masses 1, 45 has the ring gear 24 arid the intermediate mass 50 has the planet carrier 9.

Another feature of the invention resides broadly in the torsional vibration damper characterized by the fact that one of the two centrifugal masses 1, 45 has the planet carrier 9 and the intermediate mass 50 has the ring gear 24. Yet another feature of the invention resides broadly in the torsional vibration damper characterized by the fact that corresponding to one of the two centrifugal masses 1, 45 there is a recess 51 which houses at least some of the elements planet carrier 9, ring gear 24 of the planetary gearset.

Still another feature of the invention resides broadly in the torsional vibration damper characterized by the fact that the recess 51 is formed by a chamber 44 which is at least partly enclosed by one of the centrifugal masses 1, 45, which chamber 44 contains a pasty medium and is provided with a seal 43 to prevent the discharge of said medium.

A further feature of the invention resides broadly in the torsional vibration damper with two parallel planet wheels at some distance from one another, characterized by the fact that the planet carriers 9, covering at least some of the elements planet wheel 20, ring gear 24 of the planetary gearsets on both sides, form a retention means for the pasty medium and extend to tight up against a centrifugal mass 1, 45 which houses the radially inner end of the planet carriers 9.

Another feature of the invention resides broadly in the torsional vibration damper characterized by the fact that the chamber 44 is enclosed in the circumferential area by a ring 26 formed on the respective centrifugal mass 1, 45, which at least on one side has a seal 43 which extends radially inward and is in contact with the outside of the corresponding element 9, 20 of the planetary gearset, which seal 43 is in the form of a sealing plate 40 for the chamber 44.

Yet another feature of the invention resides broadly in the torsional vibration damper characterized by the fact that the seal 43, on the side of the ring 26 facing the respective centrifugal mass 1, 45 has a cover plate 42 which closes the chamber 44 with respect to the centrifugal mass 1, 45.

Still another feature of the invention resides broadly in the torsional vibration damper characterized by the fact that one of the centrifugal masses 1, 45, on its side facing the other centrifugal mass, has an axial motion retainer 47 for the latter centrifugal mass.

A further feature of the invention resides broadly in the torsional vibration damper characterized by the fact that the motion retainer 47 is formed by a friction ring 48, the distance of which from the axis 54 of the clutch is a function of the basic friction required.

Another feature of the invention resides broadly in the torsional vibration damper with a friction device, characterized by the fact that an element planet carrier 9 of the planetary gearset has projections 10 in the radially inner portion which are engaged with a pre-determined clearance in the circumferential direction in notches 12 of the friction device 13 mounted on the corresponding circumferential mass 1, 45.

Yet another feature of the invention resides broadly in the torsional vibration damper characterized by the fact that the friction device 13 is located in the axial direction preferably between one of the two centrifugal masses 1, 45 and an element sun gear 7 of the planetary gearset, and has a spring plate 15 which is supported on a friction disc 17.

Still another feature of the invention resides broadly in the torsional vibration damper characterized by the fact that one of the centrifugal masses 1, 45 has a chamber 44 which is at least partly filled with a pasty medium, and is designed with actuator elements 32 for the spring device 28 located in the chamber 44, which spring device 28 is supported on the other end on the planet carrier 9.

A further feature of the invention resides broadly in the torsional vibration damper characterized by the fact that the planet carrier 9 and the other elements sun gear 7, planet wheel 20, ring gear 24 of the planetary gearset are located in a recess 51 provided between the chamber 44 and the other centrifugal mass 45.

Another feature of the invention resides broadly in the torsional vibration damper characterized by the fact that the chamber 44 is designed in the axial direction so that it is large enough to hold at least some of the elements ring gear 24, planet wheel 20 of the planetary gearset.

Yet another feature of the invention resides broadly in the torsional vibration damper characterized by the fact that the chamber 44 is bordered by an inwardly-pointing wall 52 which is fastened radially outward to the centrifugal mass 1, 45, whereby this wall 52 is provided for sealing purposes in connection with the corresponding element planet wheel 20 of the planetary gearset.

Still another feature of the invention resides broadly in the torsional vibration damper characterized by the fact that the planet carrier 9 is mounted on the centrifugal mass 1, 45 which contains the chamber 44, and for its part acts as a bearing element for the other centrifugal mass.

A further feature of the invention resides broadly in the torsional vibration damper characterized by the fact that the planet carrier 9 non-rotationally holds the other centrifugal mass 1, 45.

Another feature of the invention resides broadly in the torsional vibration damper characterized by the fact that between at least two of the three different masses 1, 45, 50, there is a bearing arrangement 60 which holds the two respective masses 1,45; 1,50; 45,50 in a predetermined radial position in relation to one another.

Yet another feature of the invention resides broadly in the torsional vibration damper characterized by the fact that the bearing arrangement 60 is located between a hub 4 corresponding to the driving-side centrifugal mass 1 and the planet carrier 9 which acts as the intermediate mass 50.

Still another feature of the invention resides broadly in the torsional vibration damper characterized by the fact that the bearing arrangement 60 is located between the hub 4 and one of the supports 62 corresponding to the driven-side centrifugal mass 45.

A further feature of the invention resides broadly in the torsional vibration damper characterized by the fact that the bearing arrangement 60 is formed by a roller bearing 63, which can be secured against axial movements on its radial inside by the hub 4 and on its radial outside by the corresponding mass 45, 50.

Another feature of the invention resides broadly in the torsional vibration damper characterized by the fact that corresponding to the roller bearing 63 on its radial outside, there are insulation shields 65, preferably having an L-shaped cross section.

Yet another feature of the invention resides broadly in the torsional vibration damper characterized by the fact that the respective two masses 1,45; 1,50; 45,50 are supported directly on one another, forming a friction bearing 67.

Still another feature of the invention resides broadly in the torsional vibration damper characterized by the fact that the support 62 of the driven-side centrifugal mass 45 is in contact with the hub 4 corresponding to the driving-side centrifugal mass 1.

A further feature of the invention resides broadly in the torsional vibration damper characterized by the fact that the hub 4 on its end facing the driven-side centrifugal mass 45 is tapered with respect to the end facing the driving-side centrifugal mass 1, and on its tapered end, the driven-side centrifugal mass 45 is supported by means of a bearing arrangement 60 with a low radial dimension.

Another feature of the invention resides broadly in the torsional vibration damper characterized by the fact that the sun gear 7 is also supported on the radial outside of the bearing 60.

Examples of clutches, and components associated therewith, which may be utilized in accordance with the embodiments of the present invention, may be found in the following U.S. Pat. No. 5,000,304 to Koch et al.; No. 4,941,558 to Schraut; No. 4,854,438 to Weissenberger et al.; No. 4,741,423 to Hayen; and No. 4,715,485 to Rostin et al.

Examples of torsional vibration dampers, and components associated therewith, which may be utilized in accordance with the embodiments of the present invention, may be found in the following U.S. Pat. No. 5,016,744, which issued to Fischer et al. on May 21, 1991; No. 4,433,771, which issued to Caray on Feb. 28, 1984; No. 4,684,007, which issued to Maucher on Aug. 4, 1987; No. 4,697,682, which issued to Alas et al. on Oct. 6, 1987; No. 4,890,712, which issued to Maucher et al. on Jan. 2, 1990; and No. 4,651,857, which issued to Schraut et al. on Mar. 24, 1987.

Examples of pasty media, which may be utilized in accordance with the embodiments of the present invention, may be found in the following U.S. Pat. No. 5,188,375, which issued to Pope et al.; No. 5,197,807, which issued to Kuznar; No. 5,240,457, which issued to Leichliter et al.; No. 5,195,063, which issued to Volker; No. 5,228,605, which issued to Schlicheimauer; No. 5,229,000, which issued to Ben-Nasr; No. 5,226,986 to Sakuta; No. 5,242,652 to Savigny; and No. 5,249,862 to Herold et al. The pasty media contemplated herein could conceivably include various well-known greases, oils, or other appropriate semi-solid or low-viscosity media.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application Nos. P 44 22 732.9, filed on Jun. 29, 1994, and P 43 43 802.4, filed on Dec. 22, 1993 having inventor J örg Sudau, and DE-OS P 44 22 732.9 and P 43 43 802.4 and DE-PS P 44 22 732.9 and P 43 43 802.4, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A clutch arrangement for a motor vehicle having a flywheel and a clutch, said clutch arrangement comprising:
   a flywheel;
   said flywheel comprising:
      a first flywheel portion;
      said first flywheel portion comprising a first centrifugal mass;
      said first flywheel portion comprising a structure to be connected to one of: a drive shaft of a motor vehicle and a motor vehicle clutch;
      a second flywheel portion;
      said second flywheel portion comprising a second centrifugal mass;
      said second flywheel portion comprising a structure to be connected to the other of: a drive shaft of a motor vehicle and a motor vehicle clutch;
      a torsional vibration damper;
      said torsional vibration damper being disposed to dampen vibrations between said first flywheel portion and said second flywheel portion;
      said torsional vibration damper comprising a gear system to transmit torque between said first flywheel portion and said second flywheel portion;
   said gear system comprising:
      at least one gear wheel having a first axis of rotation;
      said at least one gear wheel having a first plurality of teeth;
      a ring gear being disposed to mesh with said at least one gear wheel;
      said ring gear having a second axis of rotation;
      said ring gear having a second plurality of teeth;
      said ring gear being operatively connected to said first flywheel portion to rotate with said first flywheel portion;
      said at least one gear wheel being operatively connected to said second flywheel portion to revolve about said second axis of rotation;
      said first plurality of teeth being greater in number than said second plurality of teeth;
      said first axis of rotation being disposed a substantial distance from said second axis of rotation; and
      said first plurality of teeth being disposed to be in mesh with said second plurality of teeth.

2. The clutch arrangement according to claim 1 wherein said ring gear is disposed about said at least one gear wheel.

3. The clutch arrangement according to claim 2 comprising:
   a spring device; and
   said spring device being configured and disposed to transmit energy received from at least one of: said first flywheel portion and said second flywheel portion to at least one of: said ring gear and said at least one gear wheel.

4. The clutch arrangement according to claim 3 wherein said gear system to transmit torque between said first flywheel portion and said second flywheel portion comprises a planetary gear system.

5. The clutch arrangement according to claim 4 wherein:
   said planetary gear system comprises a planet carrier;
   said at least one gear wheel comprises at least one planet wheel;
   said at least one planet wheel is rotatably connected to said planet carrier; and
   said planet carrier is non-detachably connected to one of: said first flywheel portion and said second flywheel portion.

6. The clutch arrangement according to claim 5 wherein:
   one of: said planet carrier, said at least one planet wheel and said ring gear comprises an intermediate mass; and
   said intermediate mass being disposed and configured to be driven in relation to movement of both of said first centrifugal mass and said second centrifugal mass.

7. The clutch arrangement according to claim 6 wherein said spring device is disposed to transmit torque between said intermediate mass and one of: said first centrifugal mass and said second centrifugal mass.

8. The clutch arrangement according to claim 7 wherein:
   one of said first and second flywheel portions comprises a recess; and
   at least a portion of said planetary gear system is disposed within said recess.

9. The clutch arrangement according to claim 8 wherein:
   said clutch arrangement further comprises a pasty medium;
   said recess comprising a sealed area; and
   said pasty medium being disposed within said recess to dampen motion of said at least a portion of said planetary gear system.

10. The clutch arrangement according to claim 9 further comprising:

a bearing arrangement;

said bearing arrangement being disposed between said first flywheel portion and said second flywheel portion;

said bearing arrangement being disposed and configured to hold said first flywheel portion and said second flywheel portion in a predetermined position with respect to each other; and said bearing arrangement comprises a roller bearing.

11. A flywheel for a motor vehicle comprising:

a first flywheel portion;

said first flywheel portion comprising a first centrifugal mass;

said first flywheel portion comprising a structure to be connected to one of: a drive shaft of a motor vehicle and a motor vehicle clutch;

a second flywheel portion;

said second flywheel portion comprising a second centrifugal mass;

said second flywheel portion comprising a structure to be connected to the other of: a drive shaft of a motor vehicle and a motor vehicle clutch;

a torsional vibration damper;

said torsional vibration damper being disposed to dampen vibrations between said first flywheel portion and said second flywheel portion;

said torsional vibration damper comprising a gear system to transmit torque between said first flywheel portion and said second flywheel portion;

said gear system comprising:

at least one gear wheel having a first axis of rotation;

said at least one gear wheel having a first plurality of teeth;

a ring gear being disposed to mesh with said at least one gear wheel;

said ring gear having a second axis of rotation;

said ring gear having a second plurality of teeth;

said ring gear being operatively connected to said first flywheel portion to rotate with said first flywheel portion;

said at least one gear wheel being operatively connected to said second flywheel portion to revolve about said second axis of rotation;

said first plurality of teeth being greater in number than said second plurality of teeth;

said first axis of rotation being disposed a substantial distance from said second axis of rotation; and said at least one gear wheel being disposed to be in mesh with said ring gear.

12. The flywheel according to claim 11 wherein said ring gear is disposed about said at least one gear wheel.

13. The flywheel according to claim 12 further comprising:

a spring device; and said spring device being configured and disposed to transmit energy received from at least one of: said first flywheel portion and said second flywheel portion to at least one of: said ring gear and said at least one gear wheel.

14. The flywheel according to claim 13 wherein said gear system to transmit torque between said first flywheel portion and said second flywheel portion comprises a planetary gear system.

15. The flywheel according to claim 14 wherein:

said planetary gear system comprises a planet carrier;

said at least one gear wheel comprises at least one planet wheel;

said at least one planet wheel is rotatably connected to said planet carrier; and said at least one carrier is non-detachably connected to one of: said first flywheel portion and said second flywheel portion.

16. The flywheel according to claim 15 wherein:

one of: said planet carrier, said at least one planet wheel and said ring gear comprises an intermediate mass; and said intermediate mass being disposed and configured to be driven in relation to movement of both of said first centrifugal mass and said second centrifugal mass.

17. The flywheel according to claim 16 wherein said spring device is disposed to transmit torque between said intermediate mass and one of: said first centrifugal mass and said second centrifugal mass.

18. The flywheel according to claim 17 wherein:

one of said first and second flywheel portions comprises a recess; and at least a portion of said planetary gear system is disposed within said recess.

19. The flywheel according to claim 38 wherein:

said flywheel further comprises a pasty medium;

said recess comprising a sealed area; and said pasty medium being disposed within said recess to dampen motion of said at least a portion of said planetary gear system.

20. The flywheel according to claim 19 further comprising:

a bearing arrangement;

said bearing arrangement being disposed between said first flywheel portion and said second flywheel portion;

said bearing arrangement being disposed and configured to hold said first flywheel portion and said second flywheel portion in a predetermined position with respect to each other; and said bearing arrangement comprises a roller bearing.

* * * * *

UNITED STATES PATENT AND TRADEMARK OFFICE
CERTIFICATE OF CORRECTION

PATENT NO.   : 5,766,109
DATED        : June 16, 1998
INVENTOR(S)  : Jörg SUDAU

It is certified that error appears in the above-identified patent and that said Letters Patent is hereby corrected as shown below:

In column 14, line 37, after '24', delete "arid" and insert --and--.

In column 20, line 38, Claim 19, after 'claim', delete "38" and insert --18--.

Signed and Sealed this

Ninth Day of March, 1999

Attest:

Q. TODD DICKINSON

*Attesting Officer*      *Acting Commissioner of Patents and Trademarks*